US008185908B2

(12) United States Patent
Taniguchi et al.

(10) Patent No.: US 8,185,908 B2
(45) Date of Patent: May 22, 2012

(54) DYNAMIC SCHEDULING IN A DISTRIBUTED ENVIRONMENT

(75) Inventors: Masaaki Taniguchi, Yamato (JP); Harunobu Kubo, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 980 days.

(21) Appl. No.: 12/173,387

(22) Filed: Jul. 15, 2008

(65) Prior Publication Data

US 2008/0276242 A1    Nov. 6, 2008

Related U.S. Application Data

(63) Continuation of application No. 10/994,852, filed on Nov. 22, 2004, now abandoned.

(51) Int. Cl.
*G06F 9/46* (2006.01)
*G06F 15/173* (2006.01)
*G06F 15/177* (2006.01)

(52) U.S. Cl. ........ 718/104; 718/103; 718/105; 709/226; 709/229; 709/221

(58) Field of Classification Search ........................ None
See application file for complete search history.

(56) References Cited

U.S. PATENT DOCUMENTS

| 4,769,772 | A | * | 9/1988 | Dwyer | 707/714 |
|---|---|---|---|---|---|
| 5,526,521 | A | * | 6/1996 | Fitch et al. | 718/108 |
| 5,774,668 | A | * | 6/1998 | Choquier et al. | 709/223 |
| 6,728,961 | B1 | * | 4/2004 | Velasco | 718/105 |
| 7,024,669 | B1 | * | 4/2006 | Leymann et al. | 718/100 |
| 7,379,888 | B1 | * | 5/2008 | Mahapatro | 705/7.13 |
| 7,568,199 | B2 | * | 7/2009 | Bozak et al. | 718/104 |
| 2003/0023728 | A1 | * | 1/2003 | Yaung | 709/226 |
| 2004/0078105 | A1 | * | 4/2004 | Moon et al. | 700/100 |

OTHER PUBLICATIONS

K. Krauter, "A Taxonomy and Survey of Grid Resource Management Systems," Technical Report: University of Manitoba and Monash University, Feb. 2002, pp. 1-30.
Y. Kwok et al., "Static Scheduling Algorithms for Allocating Directed Task Graphs to Multiprocessors," ACM Computing Surveys, vol. 31, No. 4, Dec. 1999, pp. 406-471.
Papakhian, "Comparing Job-Management Systems: The User's Perspective," IEEE Computational Science & Engineering, vol. 5, Issue 2, Apr.-Jun. 1998, pp. 4-9.
M. Wu et al., "Local Search for DAG Scheduling and Task Assignment," Proceedings of the 1997 International Conference on Parallel Processing, pp. 174-180.

* cited by examiner

*Primary Examiner* — Jennifer To
*Assistant Examiner* — Abdullah Al Kawsar
(74) *Attorney, Agent, or Firm* — Lieberman & Brandsdorfer, LLC

(57) ABSTRACT

A method and system is provided for assigning programs in a workflow to one or more nodes for execution. Prior to the assignment, a priority of execution of each program is calculated in relation to its dependency upon data received and transmitted data. Based upon the calculated priority and the state of each of the nodes, the programs in the workflow are dynamically assigned to one or more nodes for execution. In addition to the node assignment based upon priority, preemptive execution of the programs in the workflow is determined so that the programs in the workflow may not preemptively be executed at a selected node in response to the determination.

13 Claims, 8 Drawing Sheets

DYNAMIC SCHEDULING IN A DISTRIBUTED ENVIRONMENT

CROSS REFERENCE TO RELATED APPLICATION(S)

The present application is a continuation of U.S. patent application Ser. No. 10/994,852 filed on Nov. 22, 2004, now abandoned, which is hereby incorporated by reference.

BACKGROUND OF THE INVENTION

1. Technical Field

This invention relates to a method and system for dynamically scheduling programs for execution on one or more nodes.

2. Description of the Prior Art

A directed acyclic graph (DAG) includes a set of nodes connected by a set of edges. Each node represents a task, and the weight of the node is the execution time of the task. Each edge represents a message transferred from one node to another node, with its weight being the transmission time of the message. Scheduling programs for execution onto processors is a crucial component of a parallel processing system. There are generally two categories of prior art scheduler using DAGs: centralized and decentralized (not shown). An example of a centralized scheduler (10) is shown in FIG. 1 to include a scheduler (30) and a plurality of program execution nodes (12), (14), (16), (18), and (20). The nodes (12), (14), (16), (18), and (20) communicate with each other and the scheduler (30) across a network. In the centralized scheduler (10), an execution request for a program is made to the scheduler (30) which assigns the program to one of the nodes (12), (14), (16), (18) or (20) in accordance with a state of each node. An example of a routine implemented with a centralized scheduler is a first in first out routine (FIFO) in which each program is assigned to a processor in the order in which they are placed in the queue. Problems with FIFO arise when a program in the queue is subject to dependency upon execution of another program. The FIFO routine does not support scheduling a dependent program based upon execution of a prior program. For example, two programs are provided with an execution dependency such that the first program requires a first data input and generates a second data output, and the second program is dependent upon the second data output from the first program execution, and the second program generates a third data output. If the scheduler assigning the programs to one or more processors is running a FIFO routine and the two programs are assigned to execute on two different nodes, the second data output from the first program execution will be on a different node than the second program execution. The second data output will need to be transferred from the node that executed the first program and produce the second data output to the node in which the second program has been assigned for execution. The process of transferring data between nodes consumes resources of both nodes associated with data encryption and decryption. Accordingly, the centralized scheduler results in a decreased utilization of both the first and second processors respectively executing the first and second programs.

In the decentralized scheduler, a plurality of independent schedulers is provided. The benefit associated with the decentralized scheduler is the scalability in a multinode system. However, the negative aspect of the decentralized scheduler is complexity of control and communication among the schedulers to efficient allocate resources in a sequential manner to reduce operation and transmission costs associated with transferring data across nodes for execution of dependent programs. Accordingly, there is an increased communication cost associated with a decentralized scheduler.

There is therefore a need for a method and system to efficiently assign resources based upon a plurality of execution requests for a set of programs having execution dependency with costs associated with data transfer and processing accounted for in a dynamic manner.

SUMMARY OF THE INVENTION

This invention comprises a method and system for dynamically scheduling execution of a program among two or more processor nodes.

In one aspect of the invention a method is provided for assigning resources to a plurality of processing nodes. Priority of execution dependency of a program is decided. In response to the decision, the program is dynamically assigned to a node based upon the priority and in accordance with a state of each node in a multinode system. Preemptive execution of the program is determined, and the program is executed at a designated node non-preemptively in response to a positive determination.

In another aspect of the invention, a system is provided with a plurality of operating nodes, and a scheduling manager to decide priority of execution dependency of a program. A global scheduler is also provided to dynamically assign the program to one of the nodes based upon the priority and a state of each node in the system. In addition, a program manager is provided to determine applicability of preemptive execution of the program, and to non-preemptively execute the program at a designated node in response to a positive determination.

In a further aspect of the invention, an article is provided with a computer-readable medium with a plurality of operating nodes in the medium. Means in the medium are provided for deciding priority of execution dependency of a program. In addition, means in the medium are provided for dynamically assigning the program to one of the nodes based upon the priority and a state of each node in the system. Means in the medium are provided for determining applicability of preemptive execution of the program, and to non-preemptively execute the program at a designated node in response to a positive determination.

Other features and advantages of this invention will become apparent from the following detailed description of the presently preferred embodiment of the invention, taken in conjunction with the accompanying drawings.

DESCRIPTION OF THE PREFERRED EMBODIMENT

Technical Details

Figure 1:
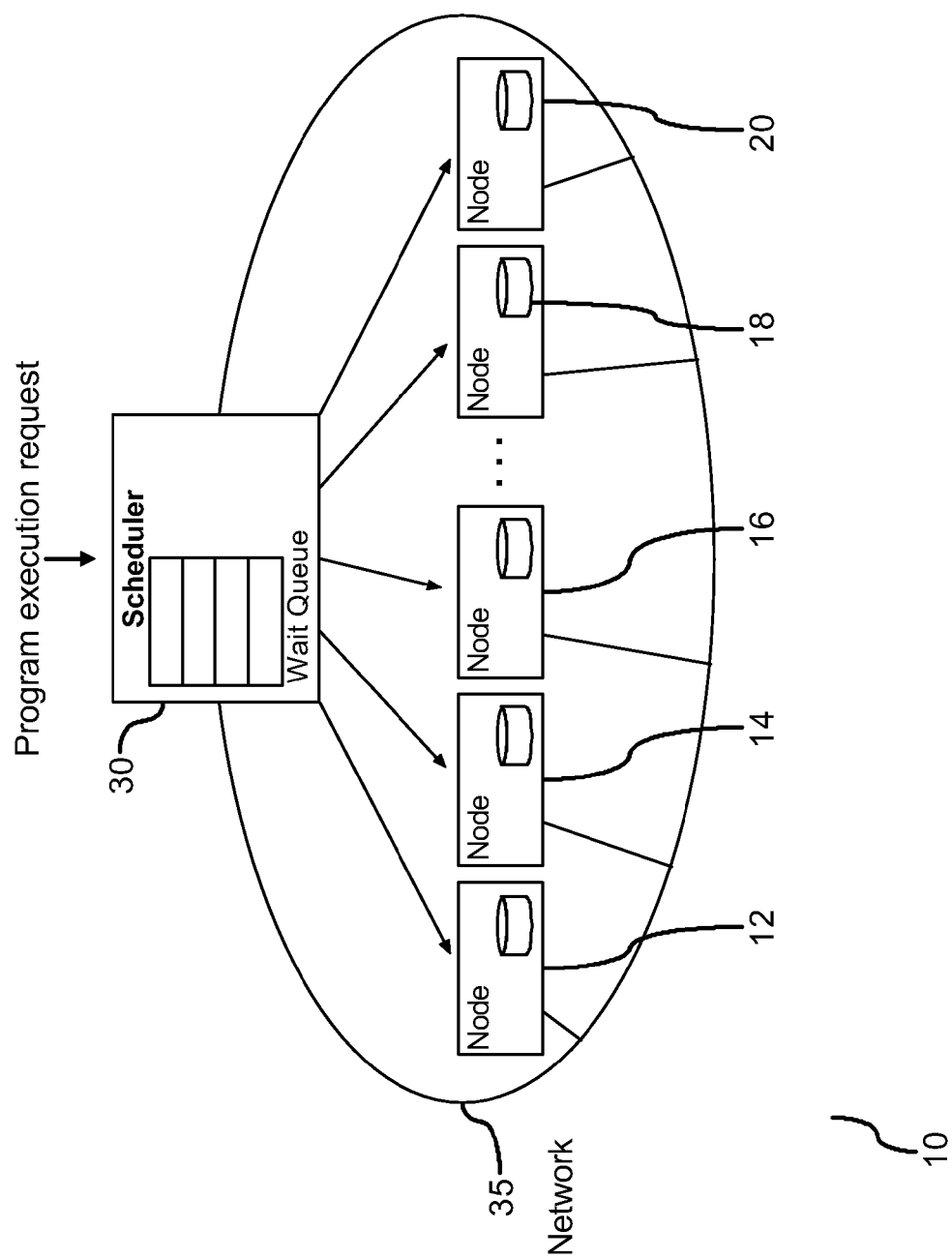
FIG. 1 is a block diagram of a prior art centralized scheduler.
Figure 2:
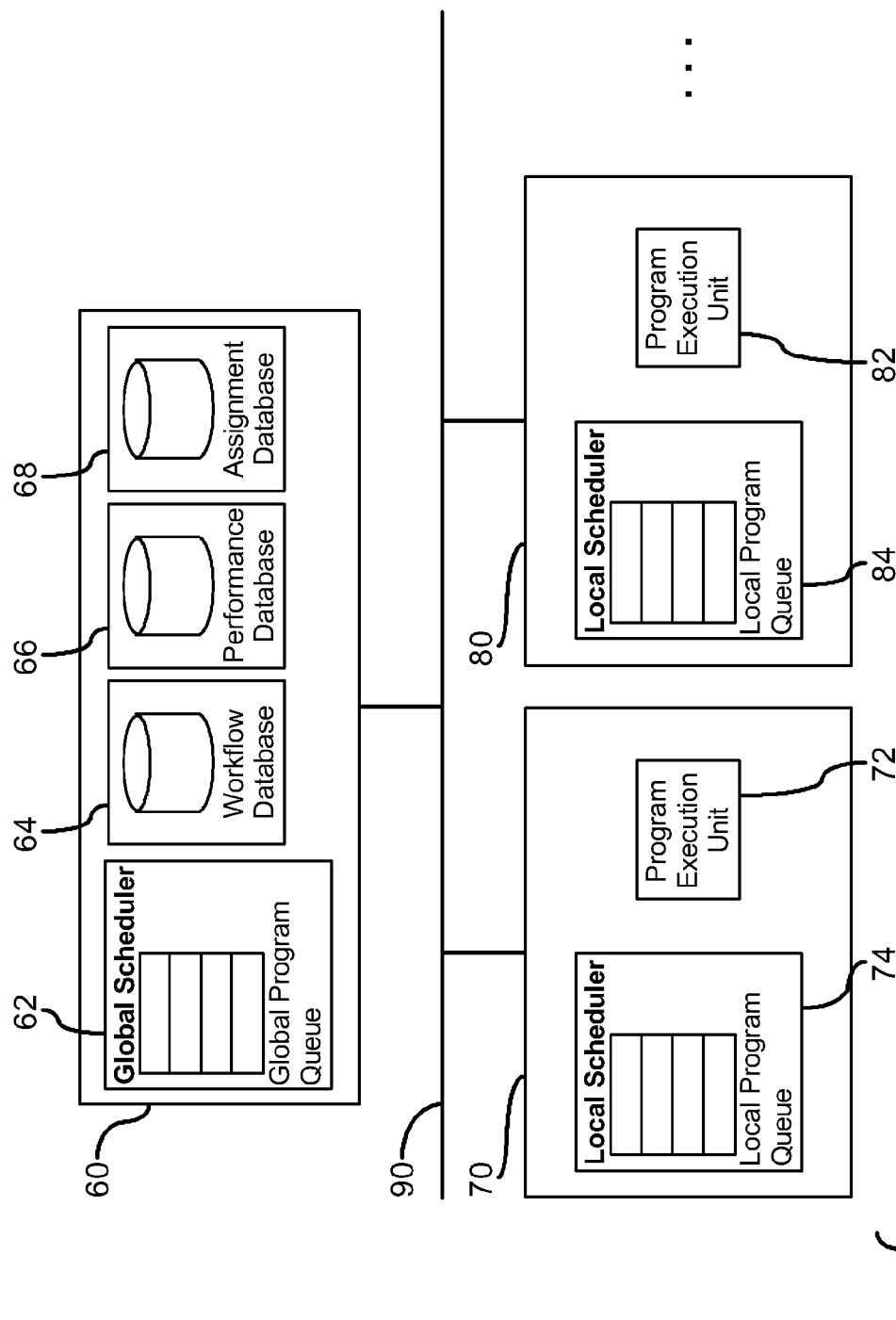
FIG. 2 is a block diagram is a global scheduler according to the preferred embodiment of this invention, and is suggested for printing on the first page of the issued patent.

A grid environment (50) is shown in FIG. 2 and is composed of a global scheduler (60) and a plurality of program execution units (70) and (80), known as nodes. Although only two nodes are shown, more nodes may be addressed to the system. Each node has a program execution unit (72) and (82), respectively, and a local scheduler (74) and (84) that has a local program execution queue (not shown) to manage execution of programs assigned to the respective node. The nodes (70) and (80) communicate with each other and the global scheduler (60) across a local or wide area network (90). An execution request for a program is made to the global scheduler (60) which assigns the program to one of the nodes (70, 80) in accordance with a state of each node to execute the program. The global scheduler (60) includes a wait queue (62), a workflow database (64), a performance database (66), and an assignment database (68). Each of the nodes (70) and (80) provide processing power, and outputs result of program execution to the destination indicated by the global scheduler (60). A web server (not shown) in communication with the global scheduler (60) and each of the nodes (70) and (80) dynamically generates transactions to obtain execution requests and process data. The global scheduler (60) controls processing of a requested program to one or more of the nodes.

Figure 3:
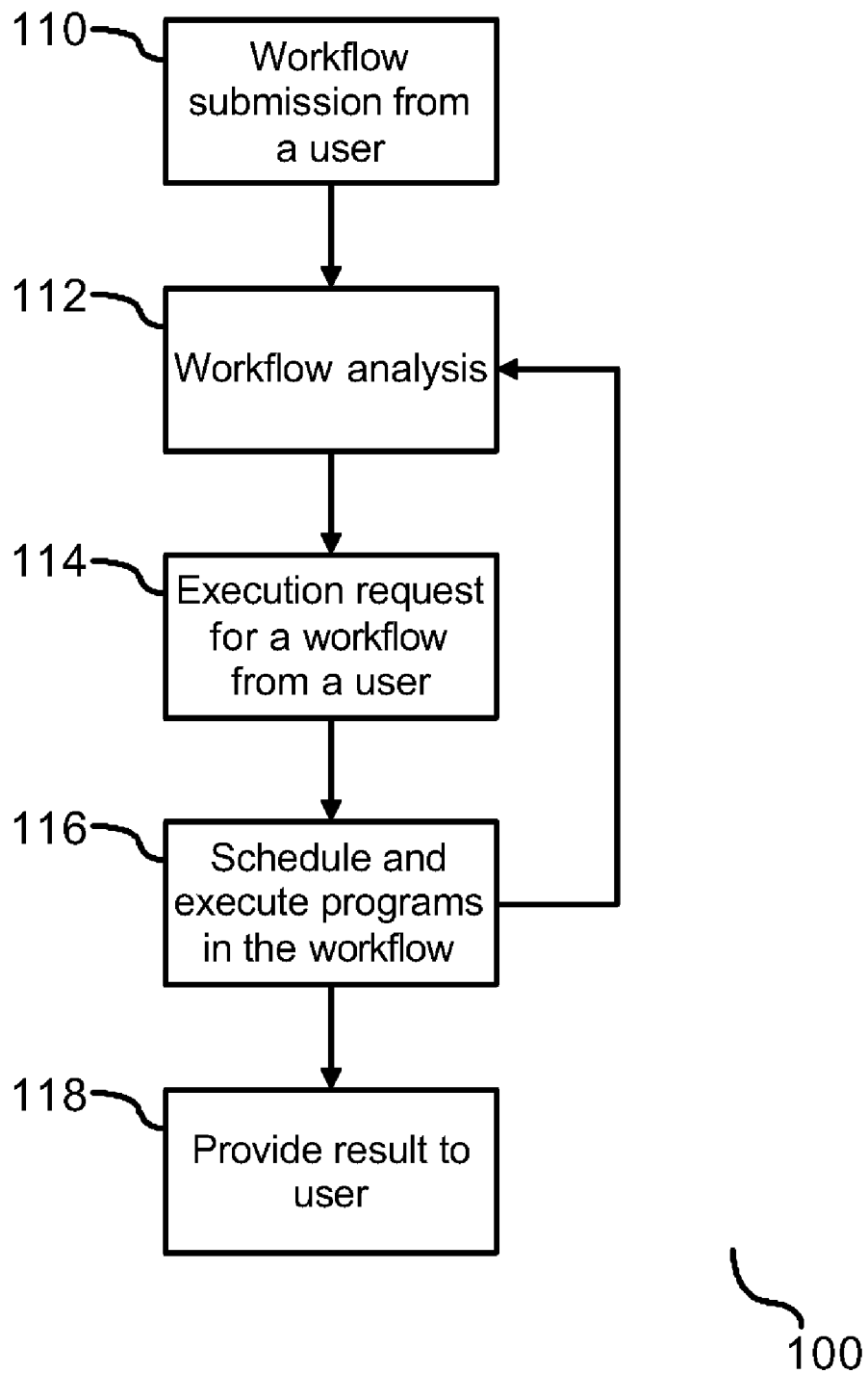
FIG. 3 is flow chart illustrating a high level operation of processing flow.

FIG. 3 is a flow chart (100) showing a high level processing of program assignments. A workflow in the form of a directed graph describing dependency of program execution is received from a user (110). The workflow is analyzed (112) prior to executing request (114) and scheduling an execution of an associated program in the workflow (116). Following execution at step (116) the results are provided to the user (118). There are essentially two procedures to the high level processing. The first procedure is the workflow analysis (112) conducted subsequent to receipt of a workflow submission, and is detailed in FIG. 4. The second procedure involves three components: an execution request for a workflow from the user (114), scheduling and executing programs in the workflow (116), and providing results to the user (118).

Figure 4:
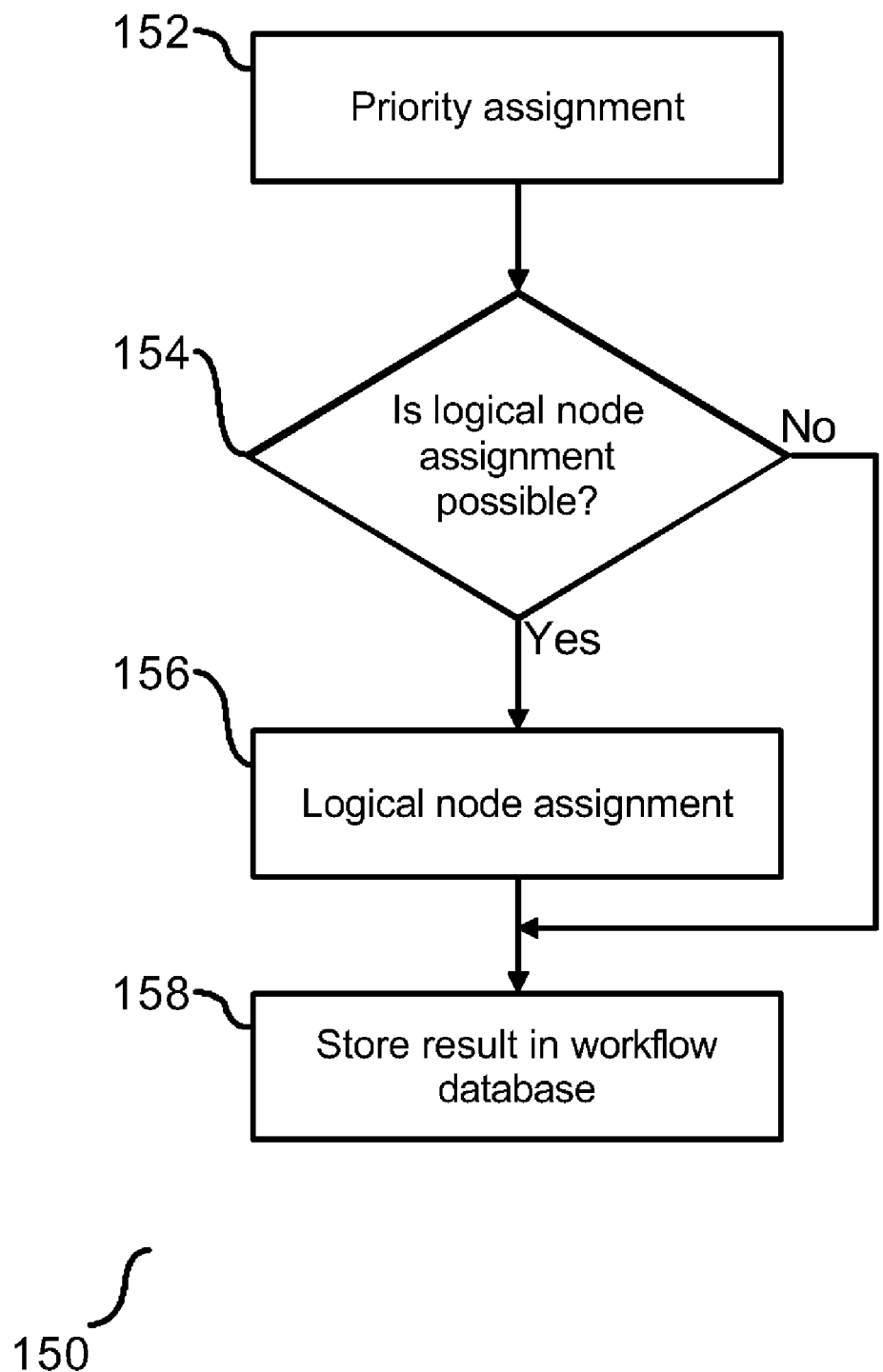
FIG. 4 is a flow chart illustrating workflow analysis.

As mentioned above, the workflow analysis (112) of FIG. 3 is shown in detail in FIG. 4 (150). The first step of the workflow analysis is assigning priority (152). The program execution priority is decided based on the execution dependency relation of a given program before actual program execution. There are two optional methods for determining priority of assignment of a program. One method is a known as topological sorting, and the second method is based upon the distance from the start program. The topological sorting method involves sorting a directed acyclic graph (DAG) and deciding the priority of the program by incrementing by a factor of 1/(i−1) in sequence, where i indicates the number of programs included in the DAG. The second method, known as the shortest path length, involves computing the distance from the start program, and then deciding the priority as the value normalized by the maximum distance. When there is more than one group of program sets to be executed, the decision on priority of execution is applied to all the program sets to be executed. In either method of assigning priority to a program, the program execution request is added to the global wait queue (62). The entries in the wait queue are sorted based on the priority assigned to the program. When any node is waiting for program execution and the wait queue is not empty, a calculation cost, i.e. cost of assignment to a target node, for program execution is conducted for each program in the queue in order of priority. After execution of the program is completed at the assigned node, an execution request for a subsequent dependent program is added to the wait queue. The entries in the wait queue are rearranged in accordance with the priority assigned to the program. This procedure is repeated until the wait queue is empty.

Figure 5:
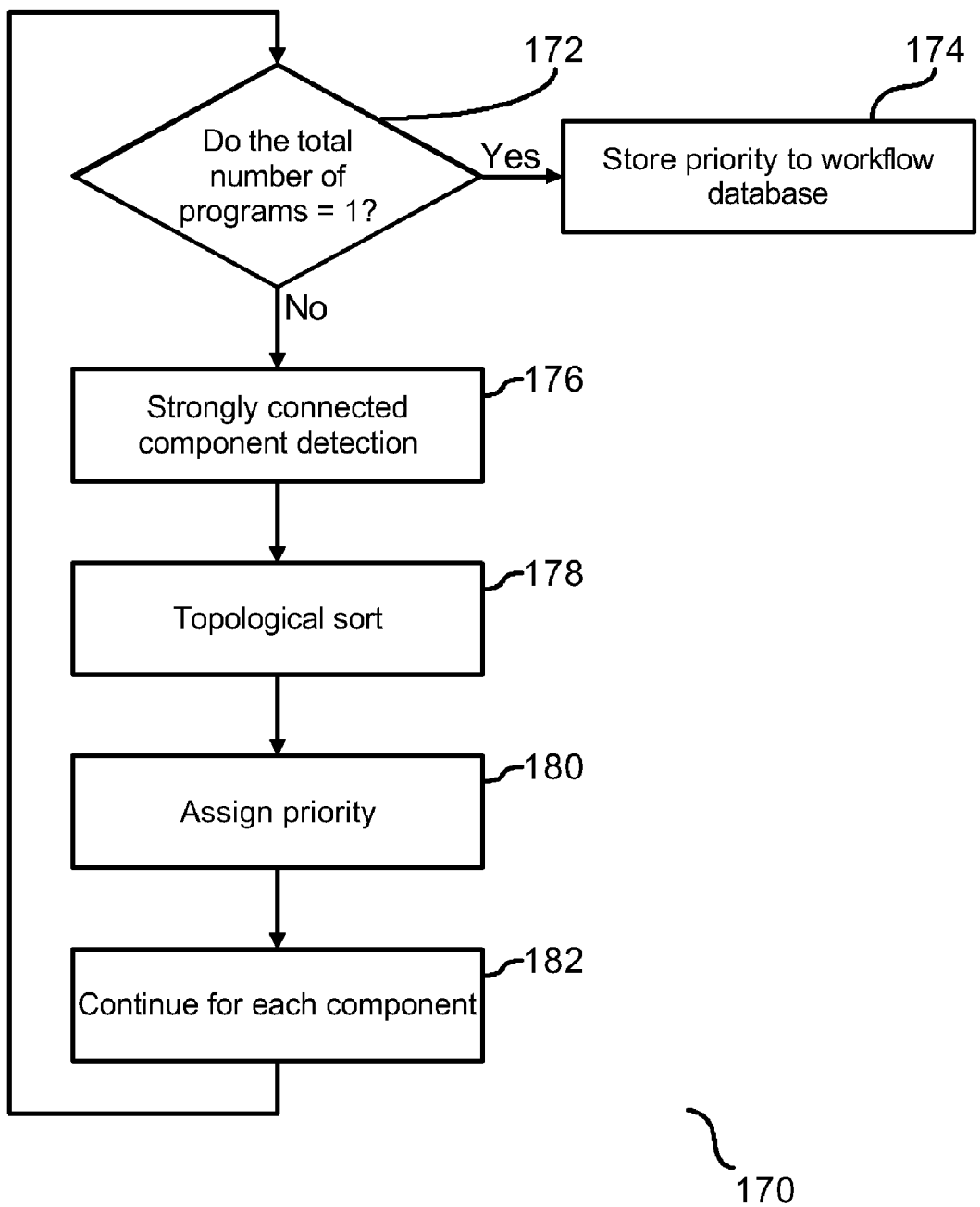
FIG. 5 is a flow chart illustrating assignment of priority to programs in a workflow.

FIG. 5 is a flow chart (170) illustrating assignment of priority to each program in a group of programs. The first step is a test to determine if there is only one program in the group (172). A positive response to the test at step (172) will result in storing the priority to this one program (174) in the workflow database (64) on the global scheduler (60). However, a negative response to the test at step (172) is an indication that there are at least two or more programs in the group that need to be prioritized. Programs making up a strongly connected component are detected and grouped together (176). The programs grouped in this manner are identified as a strongly connected component group. Other programs that are not part of a strongly connected component are each grouped individually into groups of one program each with the number of programs in each group set as an integer of one. Each of the groups are sequenced by topological sorting (178) with the priority $P_i$ of the i-th group $G_i$ being decided in the following range: $0.0 < P_i < 1.0$, such that $P_{i-1} < P$ assuming that the priority of a start group is 0.0 and the priority of an end group is 1.0.

Following the sorting process at step (178), priority is assigned to each group (180). The process of assigning priority to each group is applied recursively for each program constituting the strongly connected component group (182) by returning to step (172). The decision of priority is given to each group. For example, priority $P_i$ is given to group $G_i$ then the decision of priority for sub-group $G_{i,j}$ is made such that $P_i$ is given to group $G_{i,0}$ and the priority $P_{i,j}$ is given to the jth group $G_{i,j}$ in a range of $P_i < P_{i,j} < P_{i+1}$, such that $P_{i,j} < P_{i,j+1}$ in the sequence acquired by topologically sorting the DAG created by excluding the input into $G_{i,0}$ as the root. The purpose of normalizing the priority of each program is to enable programs in different workflows to be executed with the same presence. That is, when there are nodes for computing and the program sets have an equal total computation time, in situations when program sets request execution at the same time, the computation can be ended at the same time given the equal computation time between the sets. However, in a case where a program set includes a preferential request, the request includes a weight value. The priority assigned to the program is then multiplied by the weight value and applied to the scheduling method described above. Accordingly, it is required that the programs within the groups be recursively split into strongly connected components to decide the priority.

Figure 6:
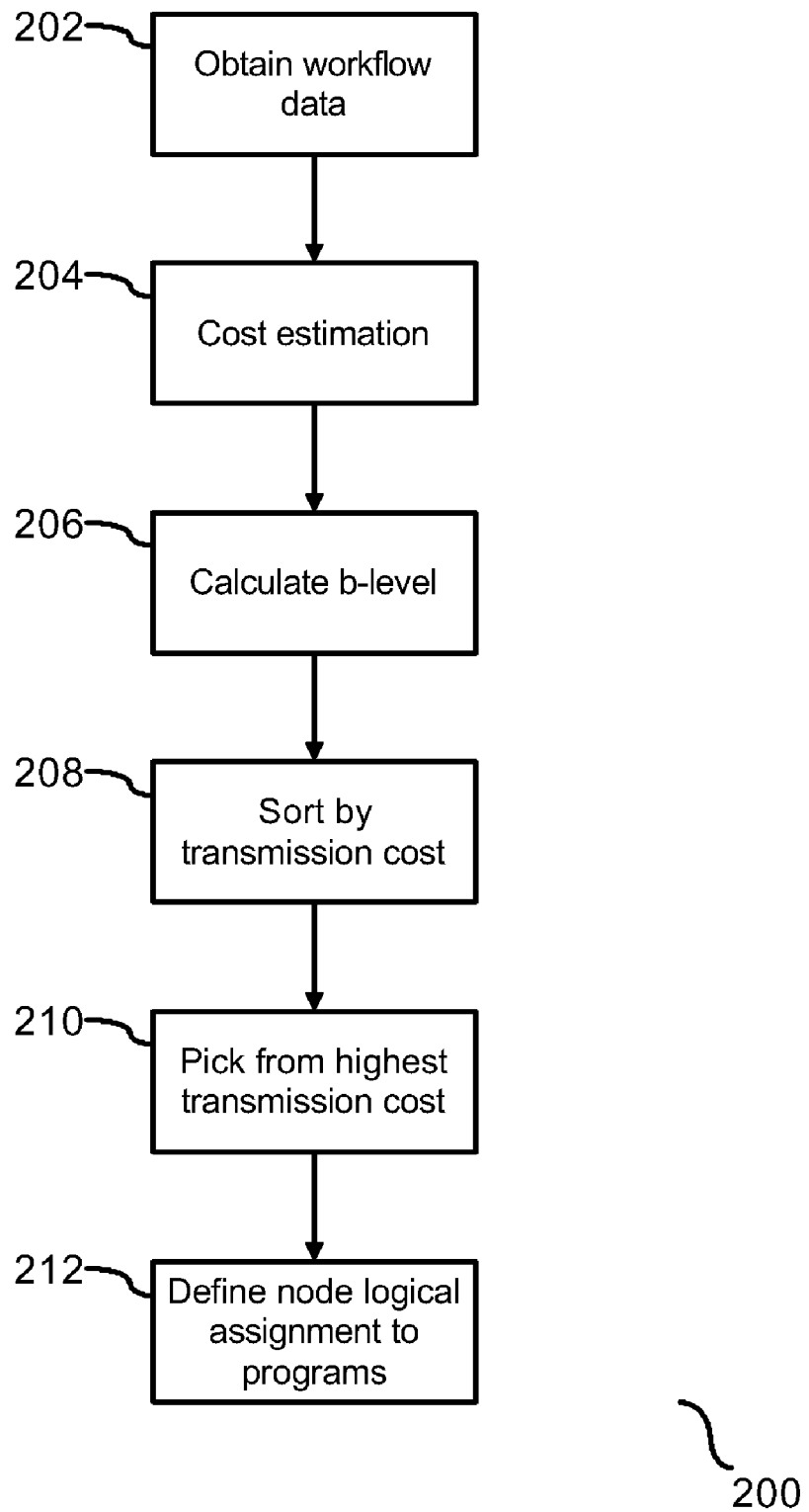
FIG. 6 is a flow chart illustrating logical node assignment.

Following the assignment of priority to a group of programs, as well as each program within a group (152), a test is conducted to determine if the program or set of programs can be assigned to a logical node to minimize the transfer of data between programs when analyzing execution dependency (154). The determination at step (154) is based upon whether the computation and/or transmission costs can be estimated. FIG. 6 is a flow chart (200) illustrating the details of the process of assigning one or more programs to a logical node, i.e. a temporary node. Initially workflow data is received (202). Following the receipt at step (202), a cost estimate of program calculation and transmission is estimated (204). From the results of measuring the execution of programs having execution dependency in the past, the relationship between input data size and output data size for the programs in the execution dependency graph and the relationship between input data size and processing costs at a node are estimated. This step focuses on assigning the program with a greater amount of computation to the node of higher performance when the required data transfer overhead is minimal and a plurality of nodes is available. The estimation modeling parameter is made by a regression analysis. The costs can be computed based on program cost assignment, such as data transfer costs and whether the program and required data is cached, and program execution cost, such as the computation amount and the predicted end time. When the estimation at step (204) is complete, the maximum cost, including the computation cost of the dependent programs (b-level) and data transmission (t-level), is calculated (206). The programs in the workflow are then sorted (208) in the order of the calculated transmission cost. The program(s) are sorted in a hierarchy starting with a program having the highest transmission cost among the programs in consideration (210). If there is a tie between one or more programs having the same transmission cost, the tie is broken based upon the maximum cost of program execution including all dependent programs. If this should also result in a tie, then a program having higher cost of program execution including all preceding program and data transmission (t-level) is selected, and if this too shall result in a tie, then the program is randomly selected among those involved in the tie. Each of the programs is assigned to one or more logical nodes (212) based upon the hierarchical arrangement of the programs from step (210). Accordingly, the logical node assignment is based upon the transmission and/or communication cost of the programs in the queue.

Figure 7:
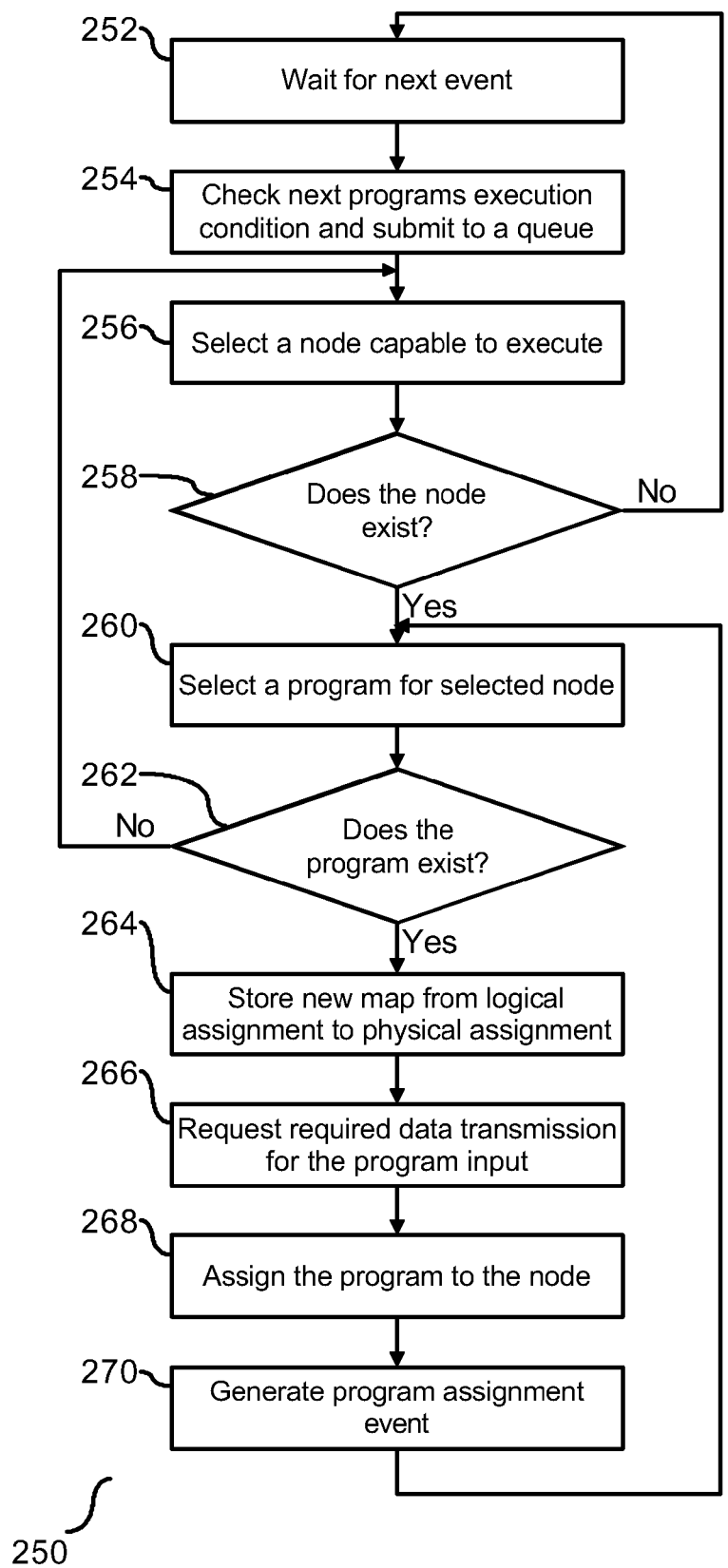
FIG. 7 is a flow chart illustrating scheduling a program at a node.

Following the process of calculating the costs associated with execution of a program or group of programs, each of the programs or program groups is assigned to one or more logical nodes (156). The assignment to the logical nodes is stored (158) in the workflow database (64) of the global scheduler (60) and is utilized for scheduling execution of associated programs on actual nodes. FIG. 7 is a flow chart (250) illustrating the process of program scheduling. The first step involves waiting for a next event (252), wherein the event may be a new request arrival event or a node status change event. Thereafter, the execution condition of the next program is checked and submitted to the queue (254). Step (254) includes providing a priority parameter, i, to a newly executable program. The priority parameter is defined as $p_i = \{b_i, d_i, m_i\}$, where $b_i$ is the priority given to the entire program, $d_i$ is the priority based on the dependency relation of each program in the execution dependency, and $m_i$ is the priority based on the correspondence relation between the logical node assignment and the actual node assignment. The priority $m_i$ has the highest priority when the node to be assigned and the actually assigned node mapped from the logical node for the program are matched. The next highest priority is when the logical node is not assigned to the actual node, and the lowest priority is when the node to be assigned to the program(s) is different from the mapped assignment. The entries in the wait queue are sorted based upon the priority parameters. The sorting is made based upon the following precedence: $m_i < d_i, b_i$, i.e. after the sorting based on $m_i$ is complete, the sorting is then based on $d_i$, followed by sorting based on $b_i$. Following step (254), a node capable of executing a program or a set of programs is selected (256). The node selection process is based upon prior calculated costs, priority, and availability. A test is then conducted (258) to determine of the node selected at step (256) exists. A negative response to the test at step (258) will result in a return to step (252). However, a positive response to the test at step (258) will result in selection of a program or a set of programs for the transfer from the logical node assignment to the physical node (260). A test is then conducted to determine if the program(s) exist (262). If the response to the test at step (262) is negative, the scheduling returns to step (256). However, if the response to the test at step (262) is positive, a new map is created and the program is assigned to the actual node (264). Thereafter, required data transmission is requested for the program input (266), the program is submitted to the physical node's local queue (268), and a program assignment event is generated (270) followed by a return to step (260). Accordingly, the process of scheduling and executing a program includes mapping the program to an actual node for execution.

Figure 8:
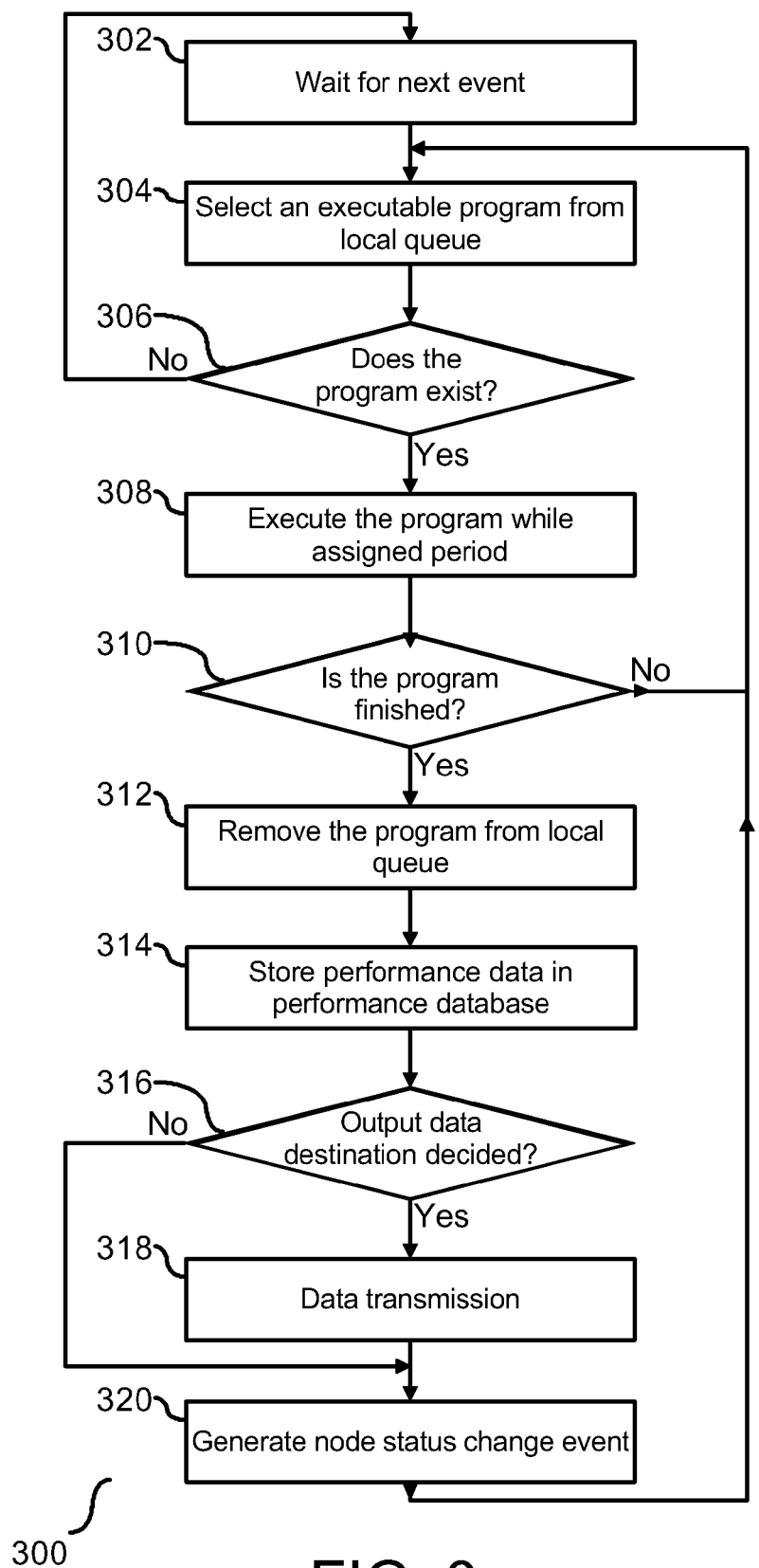
FIG. 8 is a flow chart illustrating execution of a program at a node.

FIG. 8 is a flow chart (300) illustrating a process for executing a program after it has been assigned to a physical node for execution. The first step involves waiting for a next event (302), wherein the event may be either a program assignment or data transmission completion. Thereafter, a test is conducted to determine if data transmission has been requested (303). A positive response to the test at step (303), results in transmission of the data (305). However, a negative response to the test at step (303) results in selection of an executable program from the local queue of the physical node (304). A test is conducted to determine if the program exists (306). A negative response to the test at step (306) will return to step (302) for another event. However, a positive response to the test at step (306) will result in executing the selected program within an assigned period (308). A subsequent test is conducted to determine if the program execution has concluded within the assigned time period (310). A negative response to the test at step (310) will return to step (304) to select another program from the queue. However, a positive response to the test at step (310) will remove the executed program from the local queue (312). The performance data generated from the program execution is stored in the performance database of the global scheduler (314). Thereafter, another test is conducted to determine if the destination of the data generated from the program execution has been decided (316). A positive response to the test at step (316) will allow the generated data to be transmitted (318). Thereafter or following a negative response to the test at step (316) a node status change event is generated (320). Following step (320), the process returns to step (304) for selection of a subsequent program from the local queue. Accordingly, the actual node assigned to execute the program stores performance data within the global scheduler.

Advantages Over the Prior Art

The global scheduler dynamically assigns resources while optimizing overhead. Assignment of a workflow to a logical node is employed to mitigate communication and transmission costs associated with execution of a plurality of programs in the workflow by a plurality of nodes in the system. The priority of each program is normalized and sorted in the order of priority. Accordingly, the use of the global scheduler in conjunction with logical node assignments supports cost effective assignment of programs in a workflow to an optimal mode.

Alternative Embodiments

It will be appreciated that, although specific embodiments of the invention have been described herein for purposes of illustration, various modifications may be made without departing from the spirit and scope of the invention. In particular, the assignment of programs in a workflow to a logical node to determine communication and transmission costs may be removed to allow the programs to be forwarded directly to a node having a local queue. Accordingly, the scope of protection of this invention is limited only by the following claims and their equivalents.

We claim:

1. A method for assigning resources to a plurality of processing nodes, comprising:
   prior to a program execution request, deciding priority of the program based upon execution dependency relation of the program;
   receiving the program execution request at a server, said server connected over a network to multiple physical nodes;
   assigning said program to a logical node based upon an estimated computation and data transmission cost for the program;
   storing said logical node assignment in a workflow database of a global scheduler local to the server; and
   dynamically assigning said program to a physical node for execution based upon said priority, the logical node assignment, and in accordance with a state of each of the physical nodes in a multinode system, including re-assigning the program to a different logical node based upon unavailability of the physical node, wherein each physical node includes a processing unit and memory.

2. The method of claim 1, wherein said priority is based upon a criteria selected from a group consisting of: topological sorting method, and a shortest path length from a start program.

3. The method of claim 2, wherein the topological sorting method involves sorting a directed acyclic graph.

4. The method of claim 1, wherein the step of dynamically assigning said program to a physical node includes assigning said program to a physical node at time of execution.

5. The method of claim 1, wherein the step of dynamically assigning said program to a logical node includes assigning said program to a logical node based upon estimated computation and transmission costs.

6. A system comprising:
   a plurality of operating nodes in communication with each other over a network, each operating node including a processor and memory;
   a scheduling manager adapted to decide priority of a program prior to a program execution request and based upon execution dependency relation of the program;
   said scheduling manager to receive a program execution request at a server including a global scheduler, said server connected over a network to multiple physical nodes;
   said scheduling manager to assign said program to a logical node based upon an estimated computation and data transmission cost for the program;
   said scheduling manager to store said logical node assignment in a workflow database of the global scheduler; and
   a global scheduler adapted to dynamically assign said program to a physical node for execution based upon said priority, the logical node assignment, and a state of each of the physical nodes in said system, including re-assigning the program to a different logical node based upon unavailability of the physical node.

7. The system of claim 6, wherein said priority is based upon a criteria selected from a group consisting of: topological sorting method, and a shortest path length from a start program.

8. The system of claim 7, wherein the topological sorting method includes sorting a directed acyclic graph.

9. The system of claim 6, wherein said global scheduler is adapted to assign said program to a physical node at time of execution.

10. An article comprising a non-transitory computer-readable medium storing instructions which when executed by a plurality of processing nodes including a processor and memory to cause the plurality of processing nodes to implement the method comprising:
    deciding, by a scheduler, priority of a program prior to a program execution request and based upon dependency relation of the program;
    receiving a program execution request at a server including a global scheduler, said server connected over a network to multiple physical nodes;
    assigning said program to a logical node based upon an estimated computation and data transmission cost for the program;
    storing said logical node assignment in a workflow database of the global scheduler; and
    dynamically assigning said program to one of said physical nodes for execution based upon said priority, the logical node assignment, and a state of each of said physical nodes in said system, including re-assigning the program to a different logical node based upon unavailability of the physical node.

11. The article of claim 10, wherein deciding priority of execution dependency includes criteria selected from a group consisting of: topological sorting method, and a shortest path length from a start program.

12. The article of claim 11, wherein the topological sorting method includes sorting a directed acyclic graph.

13. The article of claim 10, wherein dynamically assigning said program to one of said physical nodes based upon said priority and state of each of the physical nodes includes assigning said program to a physical node at time of execution.

* * * * *